United States Patent [19]

Sheriff

[11] Patent Number: 5,596,549
[45] Date of Patent: Jan. 21, 1997

[54] SIDE LOOK SONAR APPARATUS AND METHOD

[75] Inventor: Robert W. Sheriff, Davidsonville, Md.

[73] Assignee: Northrop Grumman Corporation, Los Angeles, Calif.

[21] Appl. No.: 498,829

[22] Filed: Jul. 6, 1995

[51] Int. Cl.⁶ .................................................. G01S 15/89
[52] U.S. Cl. .............................................. 367/88; 367/106
[58] Field of Search .................................. 367/88, 92, 103, 367/105, 106

[56] References Cited

U.S. PATENT DOCUMENTS

| | | | |
|---|---|---|---|
| 4,088,978 | 5/1978 | Gilmour | 367/88 |
| 4,199,746 | 4/1980 | Jones et al. | 367/88 |
| 4,493,064 | 1/1985 | Odero et al. | 367/106 |
| 4,712,200 | 12/1987 | Cassou | 367/88 |
| 4,958,330 | 9/1990 | Higgins | 367/88 |

*Primary Examiner*—Ian J. Lobo
*Attorney, Agent, or Firm*—Walter G. Sutcliff

[57] ABSTRACT

A side look sonar apparatus having a linear array of receiving elements mounted to an underwater platform vehicle which has an aperture with a cross track dimension greater than the along track dimension. The cross track beams are processed to form synthetic aperture beams in the along track dimension. One embodiment generates a synthetic aperture beam for each cross track beam. A second embodiment generates a single synthetic aperture beam.

30 Claims, 6 Drawing Sheets

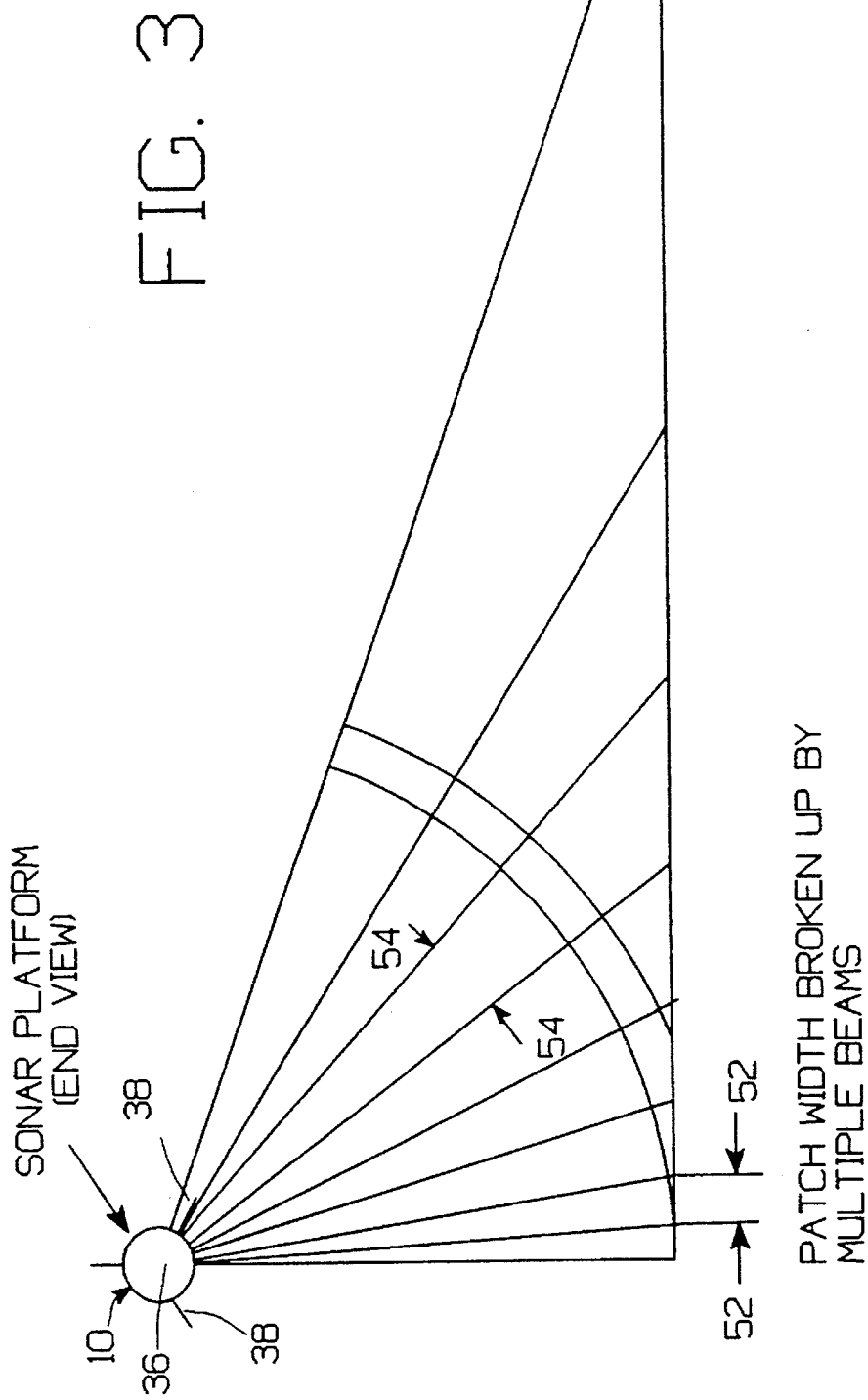

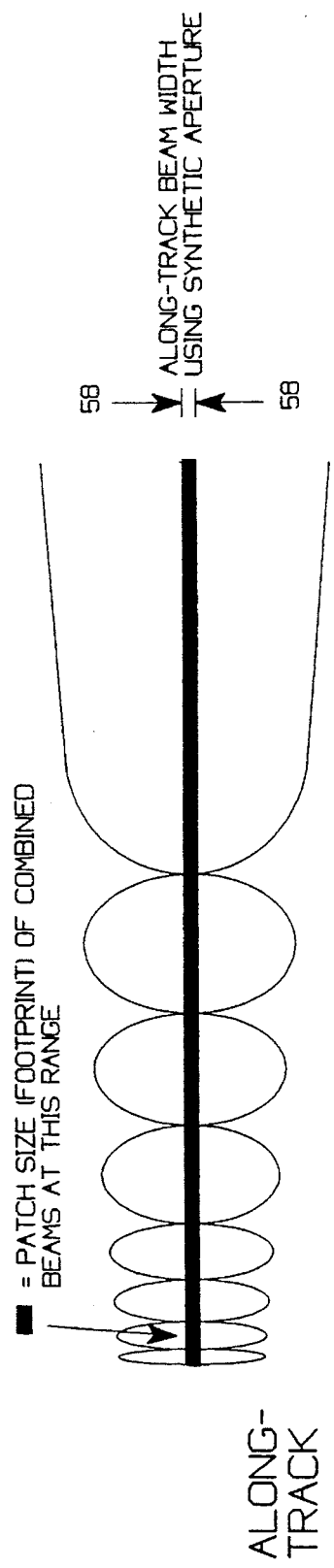
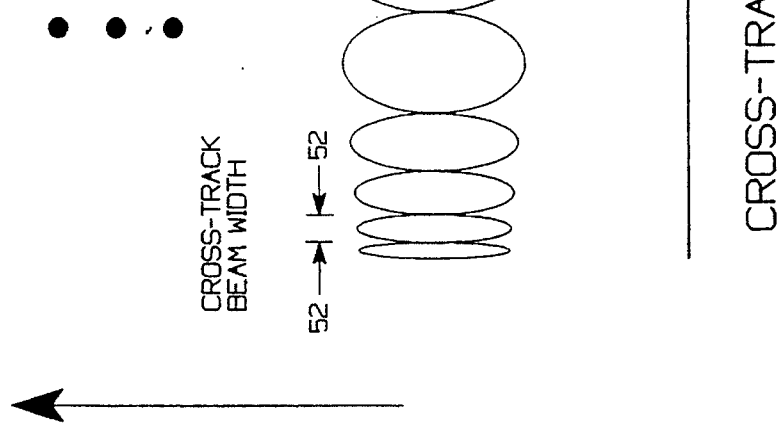
FIG. 5B
FIG. 5A

SIDE LOOK SONAR APPARATUS AND METHOD

BACKGROUND OF THE INVENTION

1. Field of the Invention

The present invention relates to sonar, and more particularly, to an apparatus and method for side look sonar.

2. Description of Related Art

In sonar systems, acoustic energy is emitted toward a target field which is comprised of numerous scattering points. Reflected energy or echos from these scattering points is detected by a receive array including of one or more receiver elements. The output signals from the receiver elements are proportional to the reflectivity response of the scatters as the energy propagates across the target field. In side looking sonar systems, energy is emitted in a direction normal to an underwater platform's direction of travel. By emitting pulses at regular time intervals as the underwater platform advances, a two-dimensional reflectivity map of the target field may be collected over time. The resulting two dimensional map may be detected and processed to form an image of the ocean bottom for example.

Generally, the performance of side looking sonar imaging systems is governed by resolution in both the direction of platform movement, herein referred to as along track, and normal to platform movement, herein referred to as cross track. Resolution determines the degree to which signals of interest, such as targets, are separable or in other words detectable from bottom reverberation. Improved resolution minimizes the patch size intercepted in along track and/or cross track dimensions. The smaller the patch size, the better the detection performance because the bottom reverberation with which target returns must compete is reduced. Along track resolution is determined by the horizontal receive array aperture. A fixed horizontal aperture defines a response function that is fixed over an angular extent, that is, beamwidth. Thus, as range increases, the along track direction of the patch from which acoustic energy is received grows in the along track dimension thus reducing resolution.

Cross track resolution is determined largely by the transmit pulse width at long ranges. At ranges closer to the platform, the pulse intercepts the bottom with a higher grazing angle, causing the dimension of the cross track patch width to grow relative to long ranges. A higher grazing angle and larger patch size increases the bottom reverberation that is returned to the receiver. Thus, targets located at close in ranges are therefor more difficult to detect than those at far field ranges since they compete with higher background signals. Because of this limited performance, the region near the platform is referred to as the "gap."

In light of the foregoing, there is a need for a side looking sonar system and method that eliminates the gap without sacrificing the resolution in the along track direction.

SUMMARY OF THE INVENTION

Accordingly, the present invention is directed to a side looking sonar system and method that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and obtained by the apparatus and method particularly pointed out in the written description and claims hereof as well as the appended drawings.

To achieve the objectives and other advantages, and in accordance with the purpose of the invention, as embodied and broadly described, the invention is a side look sonar apparatus for detecting targets in a cross track direction normal to an along track direction of travel of an underwater platform throughout an area extending cross track from a close in range beneath the platform to a far field range from a side of the platform that includes a projector for mounting to the platform to emit sonar pulses of a selected carrier frequency in the cross track direction throughout the area; a linear array of receiving elements for mounting to the platform to extend longitudinally and across track direction substantially normal to the along track direction of travel of the platform. Each of the receiving elements has an aperture with a cross track dimension greater than an along track dimension. Each of the receiving elements are positioned to detect echoes from an area having a cross track dimension proportional to the angular distance from the close in range. In addition, a receiving circuit is coupled to each of the receiving elements and responsive to each received echo of an emitted pulse to produce an output signal in accordance with in-phase and quadrature phase components of the emitted carrier frequency; a cross track beam forming circuit is coupled to each output of a respective one of the receiving circuits for applying an appropriate phase shift to each one of said output signals to form a set of cross track beams. In addition, a first in, first out memory for storing and reading out a selected number of successive cross tracks beams and a means responsive to the reading out of said cross track beams is provided for forming synthetic aperture beams in the along track direction from each cross track beam.

In another aspect, the invention is a method of detecting sonar underwater targets from an underwater platform in a cross track direction normal to an along track direction of travel of the platform throughout an area extending cross track from a close in range beneath the platform to a far field range from a side of the platform comprising the steps of emitting sonar pulses from the platform of a selected carrier frequency in said cross track direction throughout said area; receiving echoes of the emitted pulses that receiving elements positioned on the platform in a cross track direction substantially normal to the along track direction of travel of the platform; the echoes being detected from an area having a cross track dimension proportional to the angular distance from the close in range; producing an output signal in response to each received echo of an emitted pulse in accordance with in-phase and quadrature phase components of the emitted carrier frequency; forming a cross track beam for each of the receiving elements; storing and reading out a selected number of successive cross track beams; and forming a synthetic aperture beam in the along track direction using one of the receiving elements and combining the synthetic aperture beam and the cross track beams to form their joint response.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate the embodiments of the invention, and together with a description serve to explain the principles of the invention.

BRIEF DESCRIPTION OF THE DRAWINGS

FIG. 3 is a diagram illustrating multiple narrow beams in accordance with the present invention;

FIG. 5a is a graphical representation of received beam footprints without the synthetic aperture feature of the present invention;

FIG. 5b is a graphical representation of received beam footprints in accordance with the present invention;

DESCRIPTION OF PREFERRED EMBODIMENTS

Figure 1:
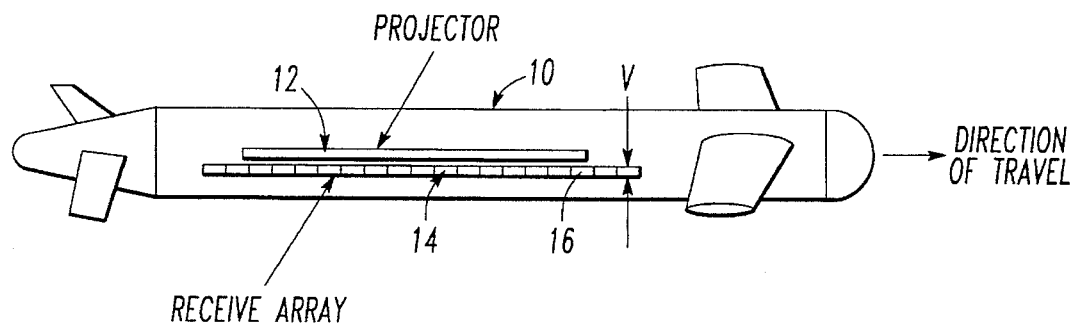
FIG. 1 is a side view of an underwater platform illustrating a conventional side look sonar array geometry using a wide horizontal aperture and narrow vertical aperture.

In describing the preferred embodiments, reference is made to the drawings wherein like reference numerals refer to like parts to the extent possible. Prior to describing the preferred embodiments, reference is made to FIG. 1 which shows an underwater vehicle 10 equipped with a typical side look sonar array configuration including of a projector 12 and a receiving array 14. The receiving array 14 includes of a collection of individual elements 16 arranged to form a horizontal aperture as the underwater vehicle travels in the along track direction. The separate projector array 12 provides for generating underwater acoustic pulses. The vertical dimension indicated by arrows v—v of the receiving array 14 is narrow relative to the horizontal dimension which extends longitudinally along the vehicle 10 for the purpose of receiving acoustic energy with a wide angular response function in the vertical plane.

Figure 2:
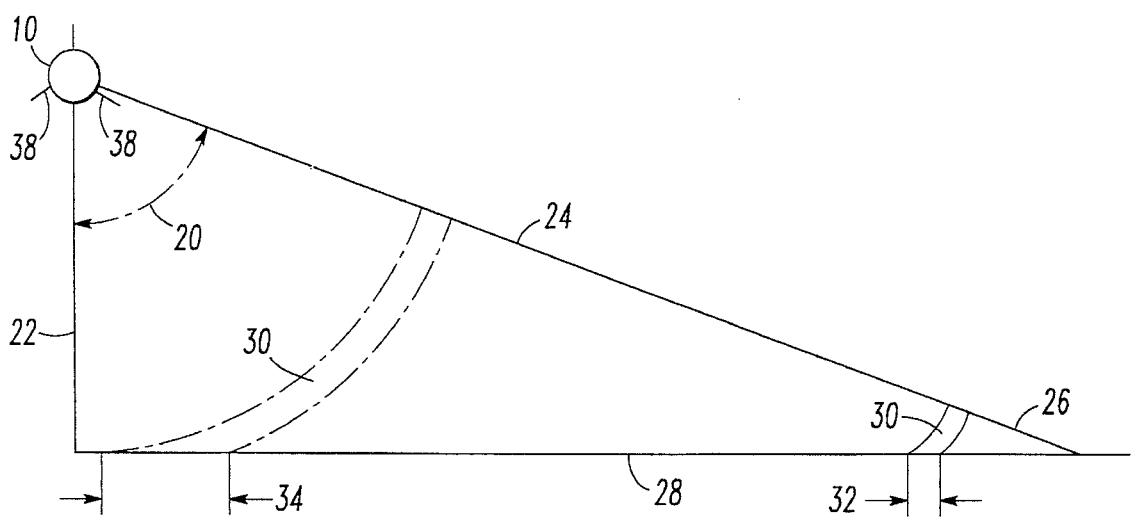
FIG. 2 is a diagram illustrating the vertical beam width of conventional side look sonars.

As shown in FIG. 2, the wide vertical beam width of the sonar system of FIG. 1 is indicated by arrow 20. It is noted that the beam width extends from a vertical boundary 22 to a slant boundary 24 which provides a far field range extending approximately to juncture 26 formed by the beam and the ocean bottom 28. Sonar pulses such as represented by an arcuate band 30 are transmitted in a direction oriented toward the ocean bottom 28. The pulse 30 propagates forward toward the juncture 26 at ever increasing range and decreasing angle. Pulse propagation at long range is nearly parallel to the bottom 28 and the patch dimension, which is the width of the ocean bottom coverage, is nearly equal to the pulse width, as shown by arrows 32. At ranges closest to the platform 10, the pulse width intercepts the bottom 28 with a higher grazing angle causing the cross track patch width to be substantially larger as indicated by arrows 34 relative to the patch width at longer ranges. A higher grazing angle and larger patch, such as 34 increases the bottom reverberation that is returned to the receiver at the platform 10. The increased reverberation from ranges closest to the vehicle creates a region of poor detection performance, commonly denoted as "the gap".

Figure 4A:
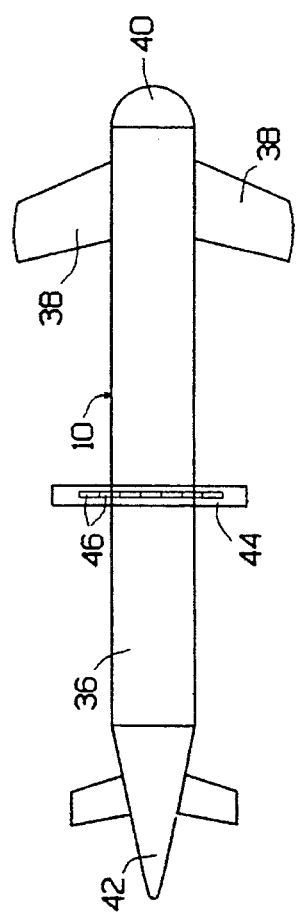
FIGS. 4a, 4b and 4c illustrate underwater platform vehicles with different array mounting arrangements in accordance with the present invention.
Figure 4C:
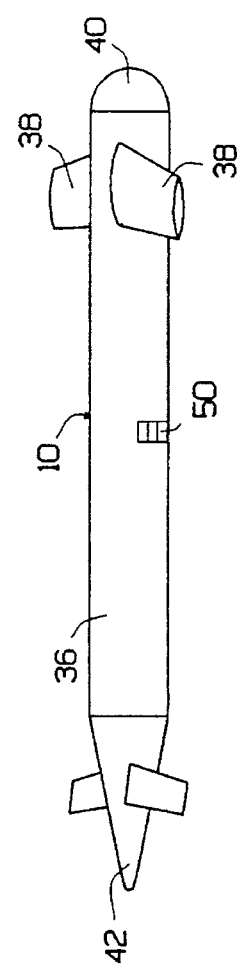
Figure 4B:
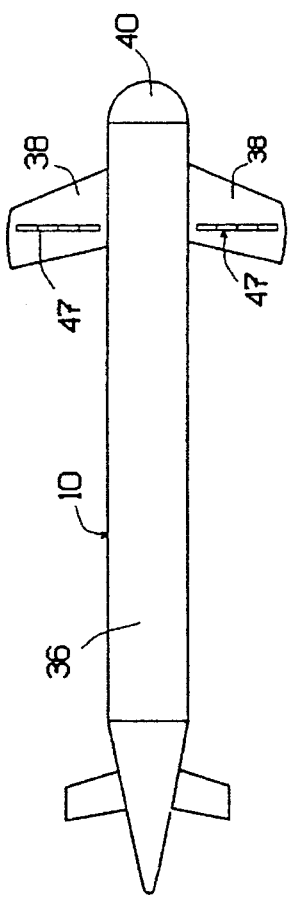

Several preferred embodiments of the present invention are shown in FIGS. 4a, 4b, and 4c. FIG. 4a shows the underwater vehicle 10 having a tubular body 36 and spaced fins 38. The vehicle 10 has a front end 40 and a rear end 42. In accordance with the present invention, the embodiment of FIG. 4a has a linear array 44 fastened to the bottom thereof, and extends transversely to the body in a flat plane intermediate the front and rear ends. The transverse linear array has a plurality of elements 46.

As shown in FIG. 4b, a linear array 47 is mounted to the underside of fins 38 at opposite sides of the body 36 to extend transversely in the direction of travel. As shown in FIG. 4c, a linear array 50 is conformally mounted to the underside of the body 36 transversely to the direction of travel.

The array mounting configurations of FIGS. 4a, 4b and 4c in accordance with the present invention provide the multiple beam concept as shown in FIG. 3. As shown in FIGS. 4a through 4c, the linear array of receiving elements, each has an aperture with a cross track dimension greater than an along track dimension, and are positioned to detect echoes from an area having a cross track dimension proportional to the angular distance from the close end range. The beams produced by the different array arrangements exemplified in FIGS. 4a, 4b, and 4c is illustrated in FIG. 3. Limiting the beam width at the bottom at close in range, as indicated by arrows 52, reduces the ocean bottom reverberation at that point thereby improving target detection. The width of the vertical beam, such as the beam indicated by arrows 54, looking further out in range is permitted to be broader than those at close range because pulse width tends to limit reverberation at longer ranges. The narrow vertical beams such as 52, for example, are formed by increasing the aperture in the cross track direction. This, of course, is accomplished in accordance with the invention by positioning the receive array such that its long or longitudinal dimension is oriented transverse to the direction of platform motion as previously described. Conventional electronic beam forming techniques may be used to steer and focus beams in the various vertical "look" directions as a function of range within the pulse receive interval.

As shown in FIG. 5a, the cross beam dimension indicated by arrows 52 and 54, for example, is substantially improved by orienting the linear arrays so that the dimension of the cross track aperture of the array is substantially greater than the along track dimension of the array. However, this improved cross track resolution is obtained at the expense of along track performance, as shown by the increased width of the beam between arrows 56, for example. To reduce the beam width in the direction indicated by the arrows 56, it is possible to extend the arrays such as 44, 47, and 50 of FIGS. 4a–4c by adding more receiving elements in the direction of travel. This solution is impractical for many applications due to the size and weight constraints imposed by underwater vehicles. Also, the electronics channel count would increase considerably driving up the cost of such a sonar system.

In accordance with the present invention, the elements of the transverse array are used to form synthetic apertures in the along track dimension. Thus, the along track beam width is reduced without increasing the number of physical receive elements carried by the sonar platform. As shown in FIG. 5b, the along track beam width regardless of range is maintained at the same width as indicated by arrows 58. Additionally, this substantially decreases the patch size or footprint of combined beams at the close end range.

In accordance with the present invention, a receiving circuit is coupled to each of said receiving elements and responsive to each received echo of an emitted pulse to produce an output signal in accordance with in-phase and quadrature phase components of the emitted carrier frequency. As herein embodied, and referring to FIG. 6, a separate receive circuit 60(1), 60(2), and 60(N) is provided for each element 62(1), 62(2) and 62(N) of the linear array. The receiving circuit 60(1) includes an amplifier 64, a pair of mixers 66, a pair of low pass filters 68, and a pair of analog digital converters 70. The amplifiers 64 increase the amplitude of the echoes received by the corresponding received element 62(1). The output of amplifier 64 is connected to the pair of mixers 66 which use sine and cosine mixing frequencies to produce sum and difference outputs on lines 72. The low pass filters 68 remove the sum frequencies from the mixer outputs to provide difference frequencies on lines 74. The resulting signals on 74 are the difference frequencies for the in-phase and quadrature phase components of the signal which are then converted from analog to digital by converters 70. The in-phase and quadrature phase digital signals are combined on line 76 to produce a complex signal. The circuits 60(2) to 60(N) have the same components as decribed on connection with 60(1), and thus, are not repeated in FIG. 6. It is also understood that any means for generating in-phase and quadrature signal components may be substituted for 60(1) through 60(N) without altering the invention described herein.

Figure 6:
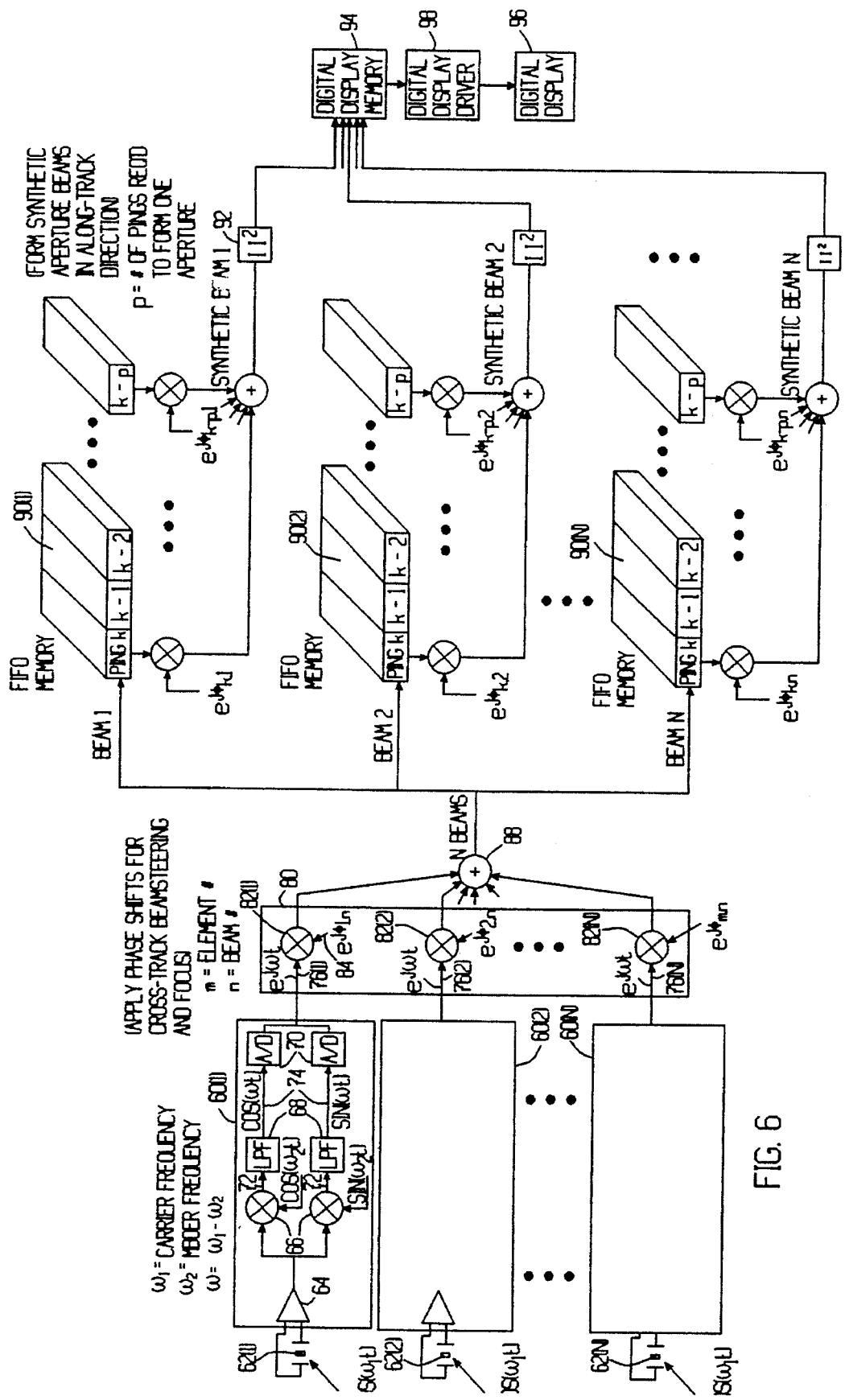
FIG. 6 is a schematic block diagram of the circuitry for generating synthetic apertures in accordance with one embodiment of the present invention.

In accordance with the invention, a cross track beam forming circuit is coupled to each output of a respective one of the receiving circuits for applying an appropriate phase shift to each one of said output signals to form multiple cross track beams. As shown in FIG. 6, a beam forming circuit 80 includes a multiplier 82(1), 82(2), 82(N) connected to outputs 76(1), 76(2), and 76(N) of receiving circuits 60(1), 60(2), 60(N) to multiply the complex signal on line the respective lines 76 with a coefficient represented at 84 which applies the appropriate phase shift to each complex output signal on the respective lines 76(1), 76(2), 76(N). The phase shifted complex signals are then summed for each beam at summing device 88.

In accordance with the invention, a first in first out (FIFO) memory is provided for storing and reading out a selected number of successive cross track beams formed by the circuit 80 and summed at 88 and means responsive to the reading out of cross track beams are provided for performing a synthetic aperture beam in the along track direction for each of the N cross beams provided at the output of 88. Referring again to FIG. 6, first in first out memory 90(1), 90(2), 90(N) is provided for each of the N beams. Each first in first out memory contains a history of cross beam data for the last P pings. As shown in FIG. 6, p equals the number of pings that are required to form one synthetic aperture. Complex phase shifts are applied to the most current set of P pings for a given cross beam as they are read from the FIFO memory. The phase shifted data from P pings from a given cross beam is then summed to form the synthetic aperture beam along track. These functions 90(1) through 90(N) are performed on each of the N cross beams to form N focussed synthetic aperture beams in the along track direction. The magnitude of each synthetic beam is computed at 92, stored in a display memory buffer 94 for output to a digital display 96 driven by a digital display driver 98.

In accordance with the second embodiment of the invention, the synthetic aperture is obtained by utilizing only a single element of the receiver array to form a synthetic aperture. The synthetic beam is multiplied by each real cross beam output as in a MILL'S CROSS ARRAY. With this embodiment, the resultant beams will be narrow in both directions, as in the first embodiment. The second embodiment is advantageous for certain applications in that the amount of computation required is considerably less, since only one synthetic beam is formed. The consequence of reduced processing, however, is that the gain against noise is lower and side lobe levels will generally be slightly higher. In either case, the overall resolution is improved over the conventional side look sonar.

Figure 7:
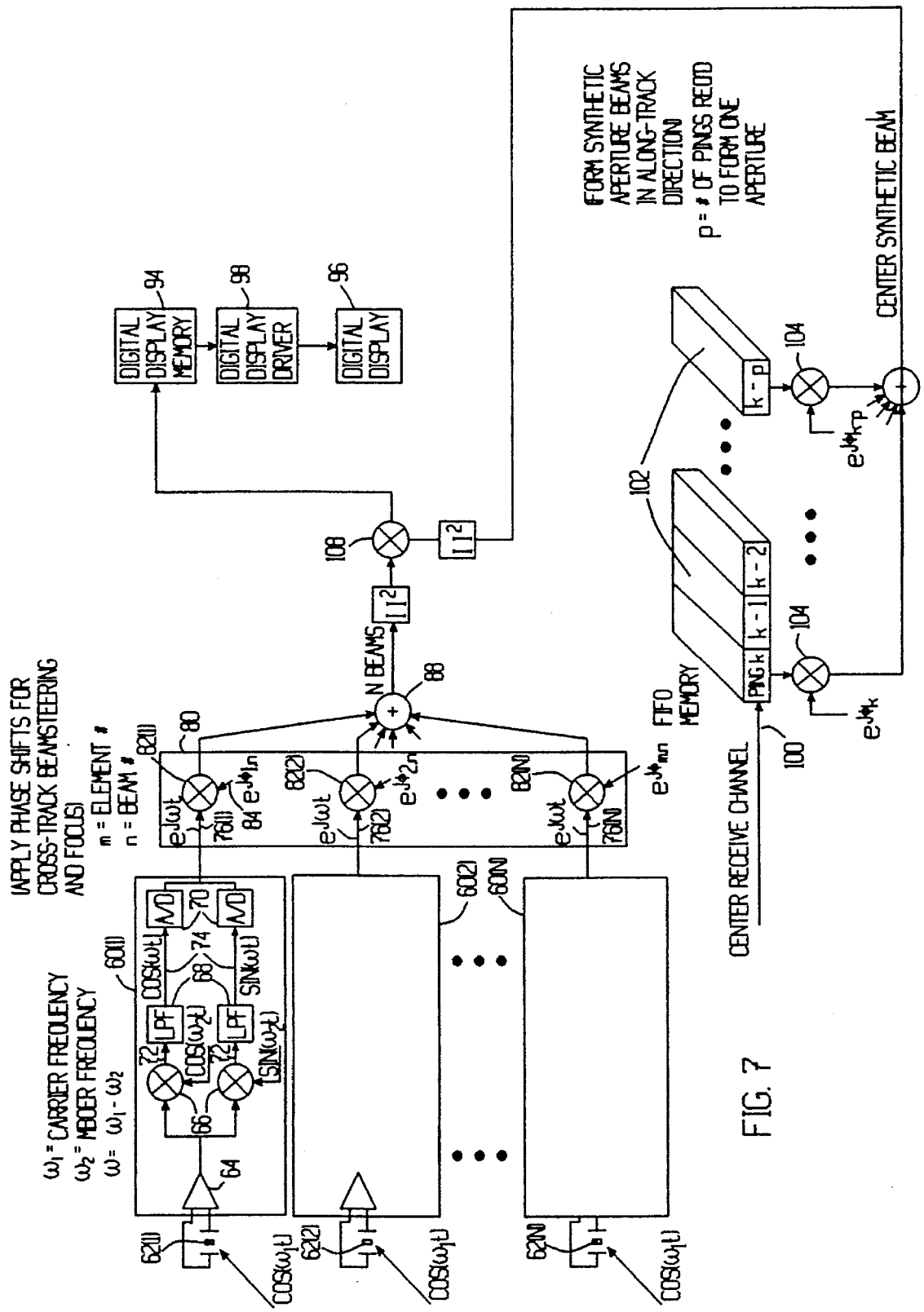
FIG. 7 is a schematic block diagram of the circuitry for forming synthetic apertures in accordance with a second embodiment of the present invention.

As shown in FIG. 7, the receiving circuit in the beam forming circuit for each received channel or element is identical to that described in connection with FIG. 6. However, the only data from the center receive element is input at 100 to a first in first out memory 102. The FIFO memory contains a history of the center receive element data 100 for the last P pings. Complex phase shifts 104 are applied to the most recent P pings as they are read from the FIFO, and the resultants are summed to form a single synthetic aperture beam that is narrow in along track and broad in cross track dimensions. The squared magnitude of the synthetic beam and the squared magnitude of the N cross beams are multiplied at 108 to form N Mill's Cross beams that are narrow in both along track and cross track dimensions. The result is applied to the digital display buffer memory 94 for the display at 96 which is driven by the driver 98.

While certain preferred embodiments of the invention have been illustrate and described, it is understood that the invention is not limited to but may be variously embodied and practiced within the scope of the following and their equivalents.

I claim:

1. A side look sonar apparatus, comprising:
   a linear array of receiving elements, mounted on an underwater platform, receiving reflected acoustic waves, wherein said linear array of elements has a length in a cross track direction of the underwater platform which is greater than a length in an along track direction of the underwater platform; and
   processing means for processing the reflected acoustic waves received by said linear array of receiving elements to produce a plurality of cross track beams, whose patch width decreases with decreasing range from the underwater platform.

2. The side look sonar apparatus of claim 1, wherein the underwater platform is a vehicle having a tubular body with a forward and a rearward end, and said linear array of receiving elements is mounted transversely to the tubular body in a flat plane intermediate the forward and rearward ends.

3. The side look sonar apparatus of claim 1, wherein the underwater platform is a vehicle having a tubular body with a forward and a rearward end, and said linear array of receiving elements is mounted to the tubular body of the vehicle intermediate the forward and the rearward ends.

4. The side look sonar apparatus of claim 1, wherein the underwater platform is a vehicle having a tubular body with a forward and a rearward end and a pair of laterally extending fins fastened to the tubular body, and said linear array of receiving elements is mounted to the fins.

5. The side look sonar apparatus of claim 1, said processing means further processing the reflected acoustic waves received by said linear array of receiving elements to form at least one synthetic aperture beam to reduce a width of the plurality of cross track beams in the along track direction.

6. The side look sonar apparatus of claim 1, said processing means further including,
   means for generating in-phase and quadrature signals from the reflected acoustic waves received by said linear array of receiving elements, cross track beamforming means for forming the plurality of cross track beams from the in-phase and quadrature signals, and synthetic aperture beamforming means for forming at least one synthetic aperture beam from the plurality of cross track beams, wherein the at least one synthetic aperture beam reduces a width of the plurality of cross track beams in the along track direction.

7. The side look sonar apparatus of claim 6, wherein said synthetic aperture beamforming means forms a single synthetic aperture beam.

8. The side look sonar apparatus of claim 7, wherein the single synthetic aperture beam is formed from a center element of said linear array of receiving elements.

9. The side look sonar apparatus of claim 7, said synthetic aperture beamforming means forming the single synthetic aperture beam by summing phase shifted data from a ping history of one of the plurality of cross track beams.

10. The side look sonar apparatus of claim 9, wherein the ping history of the one of the plurality of cross track beams is stored in a first-in first-out memory.

11. The side look sonar apparatus of claim 6, wherein said synthetic aperture beamforming means forms a synthetic aperture beam for each of the plurality of cross track beams.

12. The side look sonar apparatus of claim 11, said synthetic aperture beamforming means forming the synthetic aperture beam for each of the plurality of cross track beams by summing phase shifted data from a ping history of each of the plurality of cross track beams.

13. The side look sonar apparatus of claim 12, wherein the ping history of each of the plurality of cross track beams is stored in a first-in first-out memory.

14. The side look sonar apparatus of claim 6, said means for generating in-phase and quadrature components from the reflected acoustic waves including a receiving circuit coupled to each element of said linear array of receiving elements, each receiving circuit including, a pair of mixers using sine and cosine mixing frequencies to produce in-phase and quadrature phase components, and a low pass filter to remove a sum output and produce a difference signal at each mixer output, which represents the in-phase and quadrature signals.

15. The side look sonar apparatus of claim 6, said cross track beamforming means including, a plurality of multipliers for multiplying the in-phase and quadrature signals by a plurality of coefficients, and an adder for summing outputs of said plurality of multipliers to form the plurality of cross track beams.

16. A process, comprising the steps of:

(a) receiving reflected acoustic waves with a linear array of receiving elements mounted on an underwater platform, wherein the linear array of elements has a length in a cross track direction of the underwater platform which is greater than a length in an along track direction of the underwater platform; and (b) processing the reflected acoustic waves received by the linear array of receiving elements to produce a plurality of cross track beams, whose patch width decreases with decreasing range from the underwater platform.

17. The process of claim 16, wherein the underwater platform is a vehicle having a tubular body with a forward and a rearward end, and the linear array of receiving elements is mounted transversely to the tubular body in a flat plane intermediate the forward and rearward ends.

18. The process of claim 16, wherein the underwater platform is a vehicle having a tubular body with a forward and a rearward end, and the linear array of receiving elements is mounted to the tubular body of the vehicle intermediate the forward and the rearward ends.

19. The process of claim 16, wherein the underwater platform is a vehicle having a tubular body with a forward and a rearward end and a pair of laterally extending fins fastened to the tubular body, and the linear array of receiving elements is mounted to the fins.

20. The process of claim 16, said step (b) further processing the reflected acoustic waves received by the linear array of receiving elements to form at least one synthetic aperture beam to reduce a width of the plurality of cross track beams in the along track direction.

21. The process of claim 16, said step (b) further including the sub-steps of, (b) (1) generating in-phase and quadrature signals from the reflected acoustic waves received by the linear array of receiving elements, (b) (2) forming the plurality of cross track beams from the in-phase and quadrature signals, and (b) (3) forming at least one synthetic aperture beam from the plurality of cross track beams, wherein the at least one synthetic aperture beam reduces a width of the plurality of cross track beams in the along track direction.

22. The process of claim 21, wherein said step (b) (3) forms a single synthetic aperture beam.

23. The process of claim 22, wherein the single synthetic aperture beam is formed from a center element of the linear array of receiving elements.

24. The process of claim 22, said step (b) (3) forming the single synthetic aperture beam by summing phase shifted data from a ping history of one of the plurality of cross track beams.

25. The process of claim 24, wherein the ping history of the one of the plurality of cross track beams is stored in a first-in first-out memory.

26. The process of claim 21, wherein said step (b) (3) forms a synthetic aperture beam for each of the plurality of cross track beams.

27. The process of claim 26, said step (b) (3) forming the synthetic aperture beam for each of the plurality of cross track beams by summing phase shifted data from a ping history of each of the plurality of cross track beams.

28. The process of claim 27, wherein the ping history of each of the plurality of cross track beams is stored in a first-in first-out memory.

29. The process of claim 21, said step (b) (3) including, (b(1) (A) producing in-phase and quadrature phase components using sine and cosine mixing frequencies, and (b) (1) (B) removing a sum output and producing a difference signal at each mixer output, which represents the in-phase and quadrature signals.

30. The process of claim 21, said step (b) (2) including, (b) (2) (A) multiplying the in-phase and quadrature signals by a plurality of coefficients, and (b) (2) (B) summing outputs of said step (b) (2) (A) to form the plurality of cross track beams.

* * * * *